United States Patent [19]

Aiello et al.

[11] Patent Number: 4,959,923
[45] Date of Patent: Oct. 2, 1990

[54] ELECTRONIC INSECT TRAP

[75] Inventors: Salvatore F. Aiello; Jeffrey K. Brown; Donald F. Karasek; Edward J. Lazzeroni, Sr.; Edward J. Lazzeroni, Jr.; John F. Quella, all of Racine County; Timothy E. Zollers, Milwaukee County, all of

[73] Assignee: S. C. Johnson & Son, Inc., Racine, Wis.

[21] Appl. No.: 338,068

[22] Filed: Apr. 14, 1989

[51] Int. Cl.$^5$ ............................................. A01M 1/22
[52] U.S. Cl. .................................................... 43/112
[58] Field of Search ........................................... 43/112

[56] References Cited

U.S. PATENT DOCUMENTS

| | | |
|---|---|---|
| 1,549,161 | 8/1925 | Sutton . |
| 2,835,071 | 5/1958 | Partridge ............................. 43/112 |
| 3,077,050 | 2/1963 | Makara . |
| 3,321,862 | 5/1967 | Peek . |
| 3,729,857 | 5/1973 | Giordano ............................. 43/112 |
| 3,768,196 | 10/1973 | Iannini . |
| 3,935,662 | 2/1976 | Hamid et al. . |
| 3,998,000 | 12/1976 | Gilbert . |
| 4,109,408 | 8/1978 | Yavnieli ............................... 43/112 |
| 4,387,529 | 6/1983 | Hedstrom ............................ 43/112 |
| 4,423,564 | 1/1984 | Davies et al. . |
| 4,689,915 | 9/1987 | Grothaus et al. . |
| 4,696,126 | 9/1987 | Grothaus et al. . |

FOREIGN PATENT DOCUMENTS

| | | |
|---|---|---|
| 537566 | 3/1922 | France . |
| 1444089 | 7/1976 | United Kingdom . |

Primary Examiner—Richard K. Seidel
Assistant Examiner—James Miner

[57] ABSTRACT

An electronic trap for flying insects. Insects such as flies are attracted to the trap by a UV light source and then alight on a conductive grid with carefully spaced alternative areas of opposite potential. A pulsed cycle of electricity stuns the insects, which then dive down to a trap at the bottom of the device and, being entrapped, die.

31 Claims, 4 Drawing Sheets

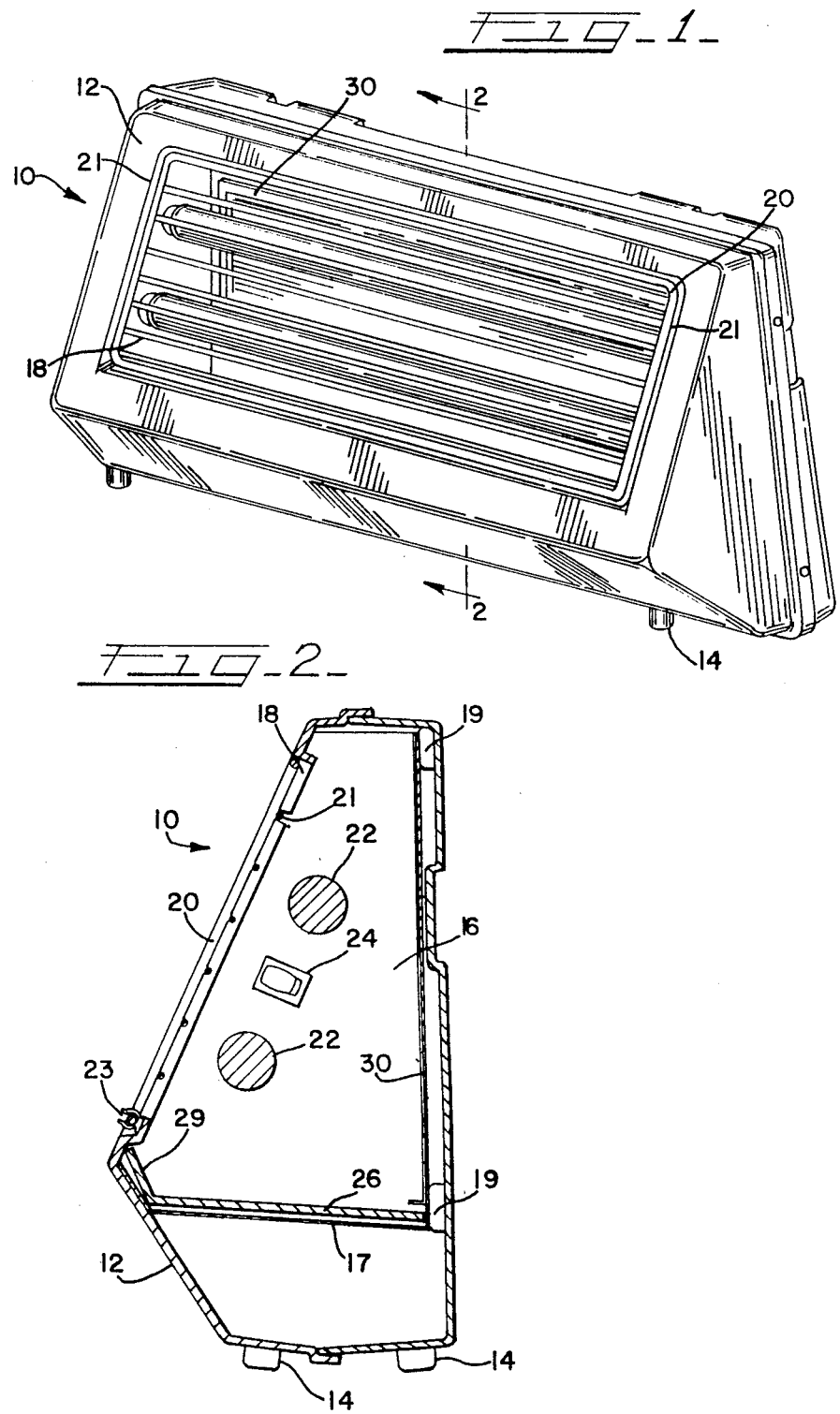

FIG-3-
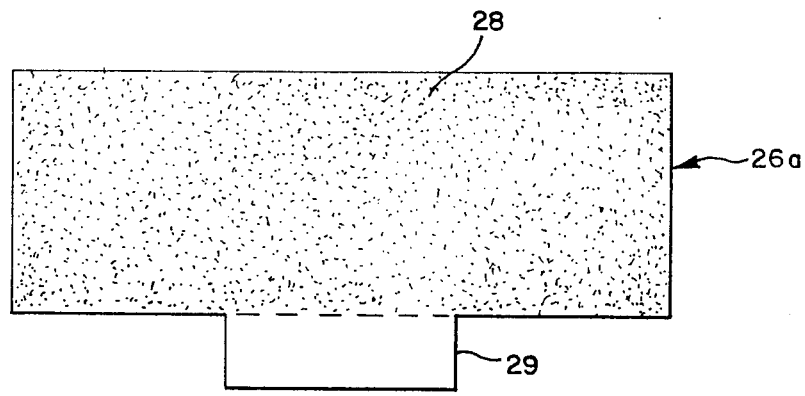
FIG-4-
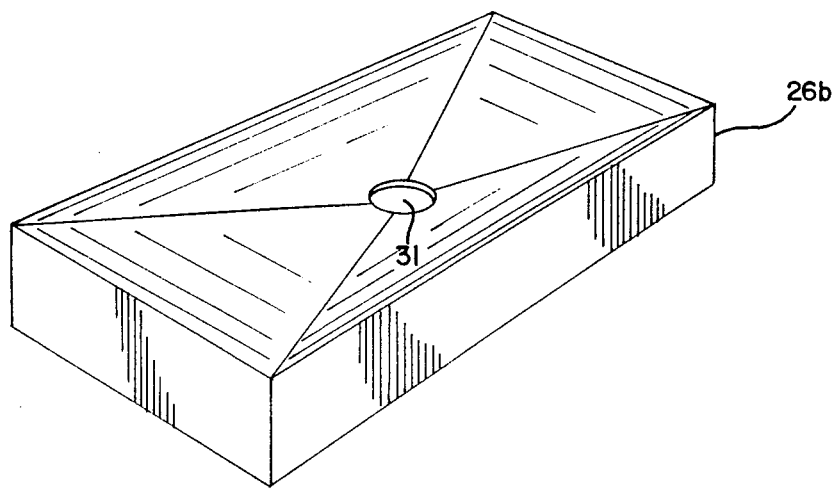

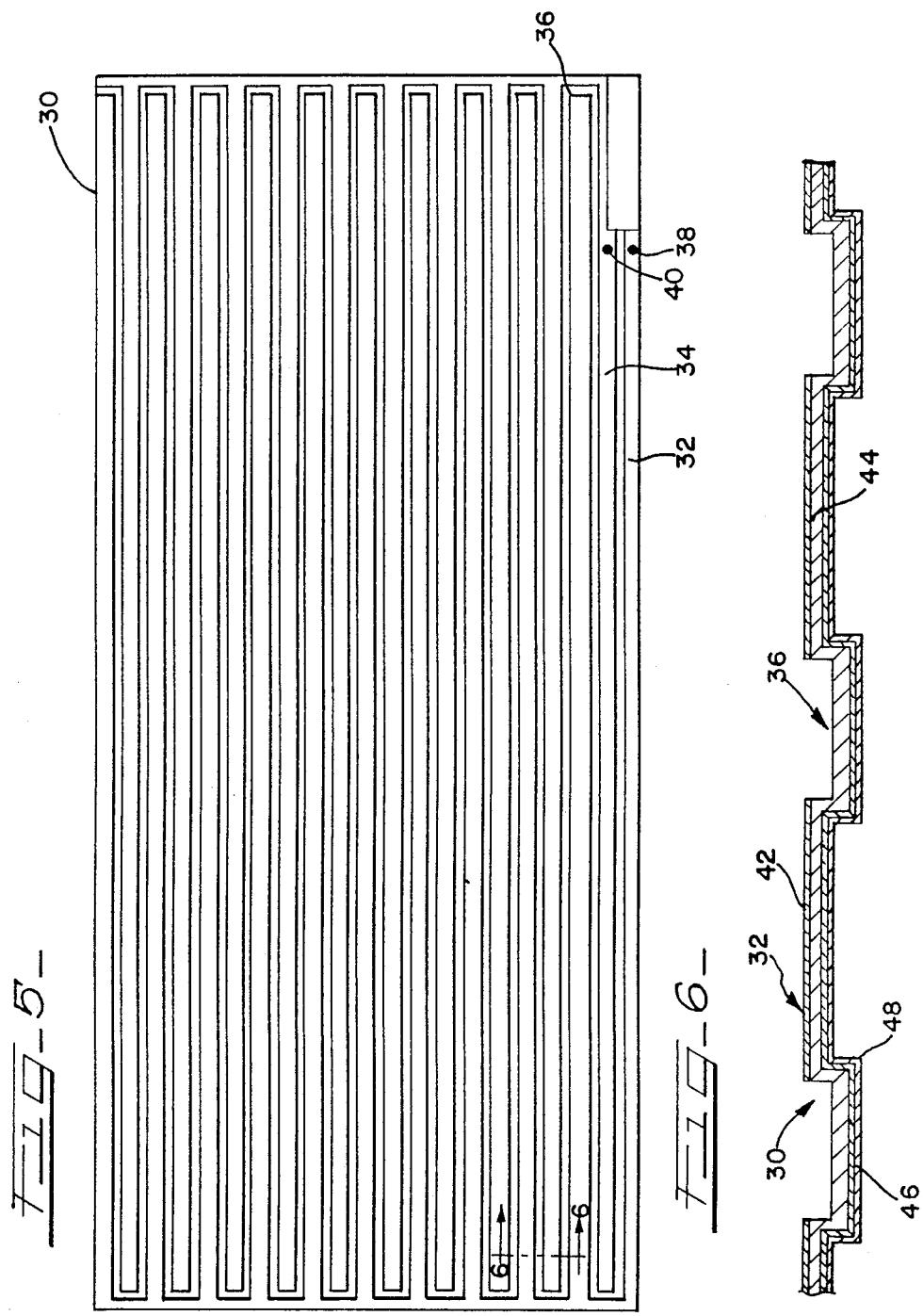

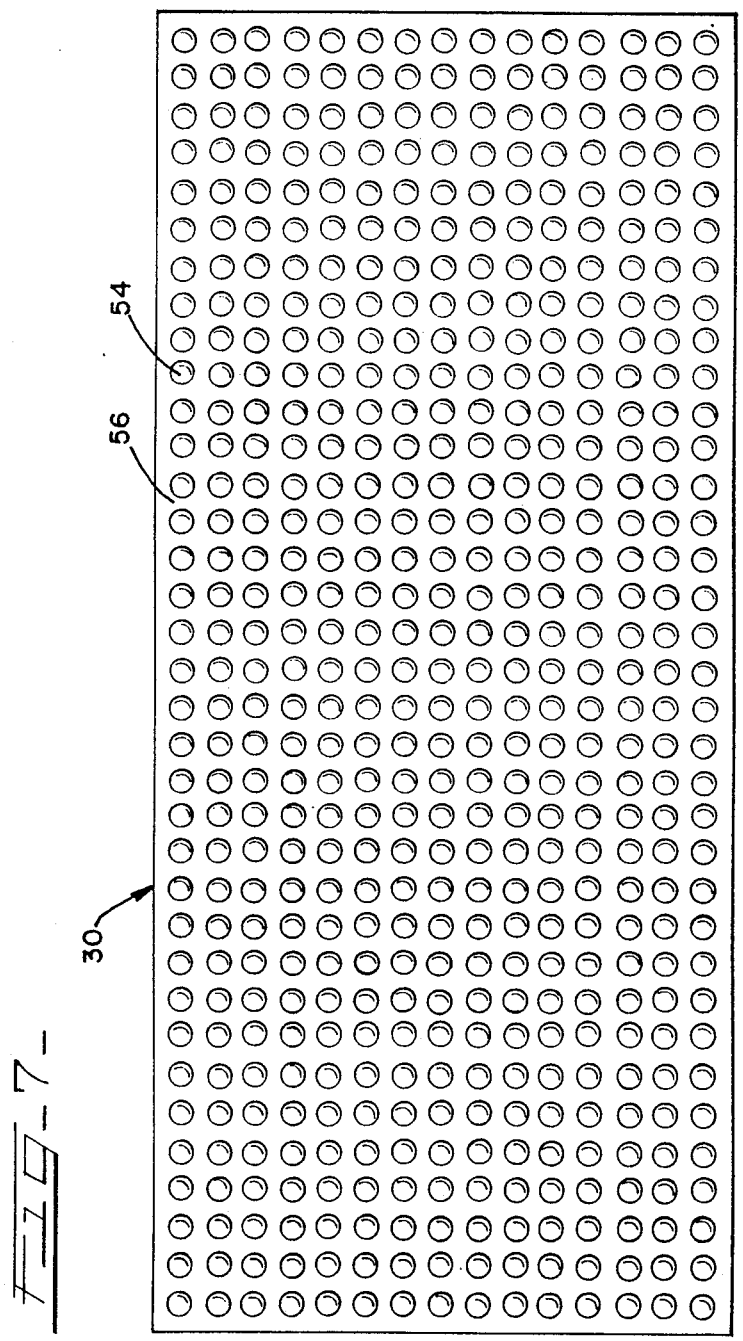

ELECTRONIC INSECT TRAP

This invention relates to the field of insect control and specifically to an electronic device for trapping and thus killing flies or other flying insects.

BACKGROUND OF THE INVENTION

Devices and methods for trapping and killing insects abound in the art and run the gamut from passive devices such as fly papers to the human-operated fly swatter to devices that are noisy and somewhat dangerous such as the electric insect killers that kill by electrocution.

Electrocution devices have several major drawbacks. Since most require fairly high voltages, the current carrying grid must be protected by an outside protective grille with such spacings as to limit the insertion of fingers and other such objects. This also limits the amount of UV light available to attract flies. The grille of an electrocution devices must be equipped with automatic power lock out devices to avoid inadvertent (or intentional) contact should they be opened or tampered with, since such devices are above UL standards for shock danger. Each electrocuted insect dies with a crack and a flash, which is both irritating and disrupting to conversation or other activities being conducted nearby. The insect itself is fragmented by the electrocution, which means that such devices can cause insect fragments to become air borne, which results in unsanitary conditions and irritation to persons in the immediate vicinity.

Chemical pesticides can be effectively employed for insect control. However, the use of chemical pesticides in non-residential areas where food is prepared or consumed is severely limited by governmental regulations.

One device, which utilizes a UV light source to attract flying insects, which then come into contact with a conductive grid, are stunned by an electric shock, and fall into a trap surrounding the device is disclosed by Grothaus et al. in U.S. Pat. No. 4,689,915, Trap for Houseflies, and U.S. Pat. No. 4,696,126, Method of Trapping Flying Insects. The device disclosed by Grothaus et al., however, lacks certain of the attractive and safety features of the present invention including the design of the grid of the present invention which is an improvement over the grid as disclosed in these patents.

Thus, it is an object of the present invention to provide an apparatus for trapping and killing flies or similar flaying insects that is effective, quiet, clean, and safe.

It is a further object of the present invention to provide such an apparatus that first attracts flies or like insects, then stuns them electronically, and traps them so that they ultimately die.

SUMMARY OF THE INVENTION

The present invention overcomes the problems of prior art fly killing devices by presenting a unit which first attracts flies or similar flying insects to itself by means of flickering UV light, known to the art as a non-chemical insect-attractant means. Insects attracted by the light enter a housing and then may alight on a conductive grid. Oppositely charged adjacent pairs of conductors of the grid array are spaced and insulated such that a resting insect need only make contact with opposing potentials to receive the effect of pulsed current. Minimal voltage and current to the grid are sufficient to orient the insect in a downward flight pattern but insufficient to kill it. The end result is a forcible downward flight of the insect where it becomes caught in a trap inside and on the bottom of the recess of the device.

BRIEF DESCRIPTION OF THE DRAWINGS

FIG. 1 is a perspective view of the invention showing the front side.

FIG. 2 is a side sectional view of the device taken along line 2—2 of FIG. 1.

FIG. 3 is a top view of one embodiment of the trap section of the invention.

FIG. 4 is a perspective view of a second embodiment of the trap section of the invention.

FIG. 5 is a view of one embodiment of the conductive grid of the invention.

FIG. 6 is a partial side section view of the grid of FIG. 5 taken along line 6—6.

FIG. 7 is a view of a second embodiment of the conductive grid of the device.

DESCRIPTION OF THE PREFERRED EMBODIMENT

In the detailed description of the drawings, like reference numbers are used on the different figures to refer to like parts.

FIG. 1 shows a perspective drawing of the electronic insect trap 10, and FIG. 2 shows a side sectional view of trap 10. Both Figures show housing 12, which is supported by feet 14, and has interior recess 16 (shown in FIG. 2) with bottom portion 17, opening 18 on one side, back portion 19, and grille structure 20 covering opening 18. Visible inside recess 16 in FIG. 1 and in side sectional view in FIG. 2, is a source of UV light 22, two blacklight UV tubes in this embodiment.

Feet 14 of housing 12 are necessary for a unit intended for floor or counter placement. A unit intended for wall mounting could be designed by the addition of appropriate attachment means, such as holes for screw attachment or hooks, on the back of housing 12. Such a design would have no need for feet 14.

As shown in FIGS. 1 and 2, grille structure 20 is hinged at point 21 on housing 12, and is secured by clip 23 (shown on FIG. 2).

FIG. 2 shows starter switch 24, which connects through unshown wiring in housing 12 to UV light sources 22.

The UV light source employed in this embodiment of the invention is one or more fluorescent tubes, preferentially, a blacklight tube having a maximum output at 350 nanometers. It is known in the art that such a light source attracts insects.

Positioned at the bottom of recess 16 is trap section 26, shown in side sectional view in FIG. 2. In one embodiment, best shown in FIG. 3, this trap section is a tray 26a having adhesive 27 on its top surface and a grasping tap 29 at one edge. Insects stunned by the pulsed current of the grid are forced downward and then become trapped upon this adhesive, ultimately dying. It is thus important that such adhesive remain tacky even after exposure to UV light. A preferred adhesive has been found to be a blend of several grades of polybutene adhesives with stabilizers. In this embodiment, tray 26a is disposable and could be, among other possible configurations, designed to fold upon itself for shipment, sale, storage, and ultimate disposal. Tray 26a would, obviously, be opened for insertion into the recess in the housing of the device and subsequent functioning as the actual "trapping" portion of the invention. Tray 26a could also be shipped and sold unfolded, with the adhesive covered by a removable cover.

Another embodiment of the trap section, shown in FIG. 4 as 26b, is, in essence, a shallow box-like collection chamber into which the stunned insects are guided by the funnel-like configuration of the top of the chamber, in which all sides slope toward a central hole 31. Obviously, more than one hole in the top of the chamber is possible, so long as the total area of the openings is sufficiently limited so that insect escape is unlikely.

Placed toward the back of recess 16 is electrically conductive grid structure 30, partially visible in FIG. 1, visible in side section in FIG. 2, and in separate top views of two embodiments in FIGS. 5 and 8. As is best shown by FIG. 5, a pattern of alternating contiguous raised areas of conductive material 32 and 34 with intervening spaces of non-conductive material 36. First area of conductive material 32 connect to one terminal 38 of a converter means which connects to a source of electric current, as will be described below. Second area of conductive material 34 connect with a second terminal 40, of opposite potential, of the same converter means.

Strips of first conductive area 32 and of second conductive area 34 alternate on the grid, so that an object, such as an insect, touching one of the strips of conductive area would, if it touched the adjacent strip of conductive area, complete a circuit and thus receive the effect of the pulsed current.

The relative spacing of the conductive areas from each other and thus the size of non-conductive space is critical to this invention, for the relative distances must be such that an average fly landing on the energized grid will in fact have one or more feet touching an area of potential and one or more feet touching an area of opposite potential in order to receive the effect of the pulsed current.

Since the leg span of the common housefly (*Musca domestica*) has been determined to be approximately 6 mm., it has been found that the optimum spacing for the conductive areas and non-conductive spaces is to have the conductive areas 4 mm. wide and the non-conductive spaces 2 mm. wide.

This grid could be manufactured by first hot-stamping appropriate designs of conductive material such as a metal foil onto a non-conductive substrate.

The design would then be embossed to raise the level of the conductive areas above the non-conductive space. Sectional views of such a grid structure are shown by FIG. 6.

As FIG. 6 shows, the conductive area 32 (or its equivalent for attachment to voltage of opposite potential 34) is a laminated structure made up of a top foil metal conductive layer 42, a central non-conductive substrate 44 of a material such as paper, fiber board, plastic or the like, a lower reflective metal foil layer 46, and a base 48 of a material such as pressure sensitive adhesive or other adhesive material. This laminated structure is formed so that raised conductive areas 32 alternate with flat spaces of non-conductive material 36, as was described before.

In another embodiment, shown in FIG. 7, the conductive areas, rather than being strips as in the first embodiments, appear as an array of closely spaced raised points 54 in a flat matrix of non-conductive material 56. The conductive areas are arranged and connected so that adjacent conductive areas are of alternate polarity when the grid is energized, in the same manner as in the first embodiment. Similarly, the relative sizes should be the same.

It was discovered that the optimum performance of the device was obtained when the angle between the grid and the trap below was less than 90°, with the optimum angle being between 80° and 90°, 86° being the angle employed in a current prototype. In this embodiment, this angle is obtained by an angling of the bottom 17 of interior recess 16 relative to the vertical position of back support portions 19 of interior recess 16. It is also important that the conductive stunning grid not be too far separated from the trap at the bottom of the device, for, since insects are stunned rather than killed by the current, too great a distance before they encounter the trap provides them with an opportunity to recover and thus escape. It was found that for the best performance of the device the distance between the furthest point of the grid and the trap should not exceed one foot.

In another embodiment of this invention, not illustrated, the conductive grid could be placed in the recess in front of the UV light, rather than behind as in the illustrated embodiments. Such a grid would have to be, of necessity, transparent or at least partially transparent to UV light. Such an embodiment would have the advantage of protecting the UV light source from breakage, and preventing insects from making contact with the UV light before they approach the conductive grid.

Conductive grid structure 30, as mentioned before, is energized by a current source, which may be, depending on the appropriate connection and converter means employed, all of which are well-known to the art and not discussed here, a wall socket or other source of alternating current, a battery contained within the device, or a solar cell.

The current source is connected to a converter means, which takes the current and converts it to a pre-determined cycle of on/off pulses. Such circuitry, consisting of appropriate transformers and rectifiers, is known to those skilled in the art and is not illustrated here. It was found that the optimal current for successful operating of the invention with most effective stun activity yet safe operation (beneath UL standards for shock danger) was power having a peak voltage of 38 V and a frequency of 300 Hz. It was also found that a square wave form rather than a sine wave form produced more effective results.

In an embodiment of this invention using an external source of AC current, the circuit used steps down the AC line voltage and rectifies it to drive a timing integrated circuit (IC 555). This integrated circuit, in conjunction with various resistors and capacitors, cycles every 8 seconds to drive a second integrated circuit (IC 556) to oscillate at 300 Hz for 1 second. Using a step-up transformer and voltage limiting diodes, a sustained peak voltage of 76 v peak to peak at 300 Hz is achieved. This sustained voltage will yield a better average sustained current which will better stun insects coming in contact with grid.

The cycling aspect of the activation of the conductive grid is important to the invention. Were the current to remain on at all times, the current would itself be sensed by insects trying to land on the grid and would serve as a low-order repellent.

By cycling or pulsing the current, insects will preferentially light on the grid, bridge the gap between conductive areas of opposite potential, and, when the current flows, receive the effect of such current. It was found that the optimal pulsing cycle ranged between a cycle of 7 to 17 seconds, with between 5 to 15 seconds off to 1 or 2 seconds on, with a cycle of 9 seconds, 8 seconds off and 1 second on being the most preferred cycle.

The low voltage current effect just mentioned is another important aspect of the invention. Most electric insect traps, as discussed before, electrocute the insects, causing both noise and fragmentation of the insects. The present invention delivers a non-lethal electrical charge to the insect which orientates it into a forcible downward flight, whereupon it becomes trapped, as will be discussed below.

This behavior of insects subjected to a non-lethal electrical charge has been noted and described in the Grothaus et al. patents discussed earlier, (in U.S. Pat. No. 4,696,126 at column 2, line 61 and column 3, line 10, and in U.S. Pat. No. 4,689,915 at column 2, line 54, to column 3, line 3), both of which are hereby incorporated by reference.

When the stunned insect dives downward, it then encounters trap 24 at the bottom of recess 16, as described earlier in connection with the description of FIGS. 3 and 4.

TESTING

Performance of the electronic insect trap of the present invention was compared to that of standard commercial electrocution type traps under laboratory conditions.

The performance of the device proved to be somewhat superior to that of the electrocution traps tested.

The major advantage of the present invention is that its method of operation allows it to be placed in areas for which the conventional electrocution device is unsuitable, due to the fact that electrocution devices, as discussed before, produce sizzling or cracking sounds, operate at higher voltages, making them inherently less safe, and produce insect fragments which can become airborne.

In addition, the trap of the present invention is smaller than conventional electrocution devices, roughly 20" long × 12" high × 6" deep at its widest point in a current prototype, and more streamlined, allowing for easier installation, especially in domestic or commercial areas. Most conventional commercial electrocution traps are big and bulky and are designed for large warehouse installation.

Placement and performance studies were conducted in five major cities during the peak summer fly season. Units were placed in the kitchen areas of commercial restaurants and monitored for performance.

Significant reductions in flying insect population were noted in a majority of test sites. The optimum performance of the present invention was recorded where good sanitation practices were followed and structural conditions were maintained.

Field test results pointed out the need for a unit that could be placed in a cluttered and busy environment. The lower three to five feet of a restaurant kitchen, where flies are most active, is usually almost totally occupied with food preparation. Corners were noted as being the most available space. The units were especially designed for this type of placement. They are also designed for counter placement when available and are unobtrusive enough to be wall mounted in areas of high traffic.

As will be apparent to one skilled in the art, various modifications can be made within the scope of the aforesaid description. Such modifications which are within the ability of one skilled in the art form a part of the present invention and are embraced by the claims.

What is claimed is:

1. An electronic insect trapping device comprising:
   an external housing having a central recess therein and an opening on one face thereof,
   a trap structure placed within and upon the bottom of said recess,
   at least one source of UV light placed within said recess, said trap structure including means for collecting and for retaining said insects,
   an electrically conductive grid structure within and against one side of said recess, said grid structure having alternating raised areas of conductivity and spaces of non-conductivity thereupon, said conductive areas being so arranged that, when the grid is energized, each area of one potential is adjacent to, but separated by a non-conductive space from, an area of opposite potential, and
   connected to said grid structure, means for converting electric current to a form effective to energize said grid with timed cycles of pulsed electric current at a controlled voltage and frequency.

2. A device according to claim 1 further comprising reflective means positioned within said recess.

3. A device according to claim 2 wherein said grid structure incorporates said reflective means.

4. A device according to claim 1 wherein the cycles of pulsed electricity delivered to the grid by said converter means are between 5 to 15 seconds off to 1 second on.

5. A device according to claim 4 wherein the cycle is 8 seconds on to 1 second off.

6. A device according to claim 1 wherein the voltage delivered to the grid by said converter means has a peak voltage of between 25 and 45 volts and a frequency of between 60 and 600 Hz.

7. A device according to claim 6 wherein the voltage delivered has a peak voltage of approximately 38 volts and a frequency of approximately 300 Hz.

8. A device according to claim 1 wherein the spacing is such that the conductive areas have a width of approximately 4 mm and the non-conductive spaces have a width of approximately 2 mm.

9. A device according to claim 1 wherein the conductive areas of said grid structure are raised strips laid out parallel to each other and so connected that alternate strips when energized have opposing potentials.

10. A device according to claim 1 wherein the conductive areas of said grid structure are discrete raised areas, such discrete areas being so connected that when the grid is energized, conductive areas of opposing potential are adjacent each other.

11. A device according to claim 1 wherein said grid structure is placed behind said UV lights source in said recess.

12. A device according to claim 1 wherein the maximum distance between any portion of the grid surface and the surface of the trap structure does not exceed one foot.

13. A device according to claim 1 wherein said source of UV light is at least one fluorescent tube.

14. A device according to claim 1 wherein said source of light is at least one blacklight tube having a peak output of light at 350 nanometers.

15. A device according to claim 1 wherein said means for connecting said source of UV light and said converter means to a source of electric current includes a separate starter switch for said source of UV light.

16. A device according to claim 1 wherein said trap structure is removable and has adhesive on the upper surface thereof.

17. A device according to claim 1 wherein said adhesive is of a type that does not undergo cross-linking in the presence of UV light but remains tacky.

18. A device according to claim 3 wherein said adhesive is a polybutene adhesive blend.

19. A device according to claim 16 wherein the trap structure is so configured that it may be folded upon itself for sale and shipping and disposal and opened up for use in the device.

20. A device according to claim 16 wherein the adhesive upon the trap structure is covered with a removable cover for protection of said adhesive during shipment and sale.

21. A device according to claim 1 further comprising a grille structure extending across the opening of the central recess of the housing, said grille having openings of sufficient size to allow easy access by flying insects.

22. A device according to claim 21 wherein said grille structure across said opening is moveable.

23. A device according to claim 22 wherein said moveable grille structure is connected to said housing by at least one fastening means.

24. A device according to claim 23 wherein said fastening means is at least one hinge means.

25. A device according to claim 23 wherein said fastening means includes at least one clip means for securing said grille to said housing.

26. A device according to claim 1 further comprising a self-contained source of electric current integrally connected to said device.

27. A device according to claim 1 wherein said source of electric current is a battery.

28. A device according to claim 1 wherein said source of electric current is a solar panel.

29. A device according to claim 1 wherein the grid structure comprises a spaced-apart pattern of conductive material which is supported by a non-conductive substrate.

30. An electronic insect trapping device comprising:
an external housing having a central recess therein and an opening on one face thereof,
a trap structure comprising a collection chamber having on its upper surface a funnel structure having at least one funnel opening leading into the collection chamber located at the bottom of the recess;
at least one source of U.V. light placed within said recess,
an electrically conductive grid structure within and against one side of said recess, said grid structure having alternating raised areas of conductivity and spaces of non-conductivity thereupon, said conductivity areas being so arranged that, when the grid is energized, each area of one potential is adjacent to, but separated by a non-conductive space from, an area of opposite potential, and
connected to said grid structure, means for converting electric current to a form effective to energize said grid with timed cycles of pulsed electric current at a controlled voltage and frequency.

31. An electronic insect trapping device comprising:
an external housing having a central recess therein and an opening on one face thereof,
a trap structure placed within and upon the bottom of said recess,
at least one source of UV light placed within said recess,
an electrically conductive grid structure within and against one side of said recess, said grid structure having alternating raised areas of conductivity and spaces of non-conductivity thereupon, said conductive areas being so arranged that, when the grid is energized, each area of one potential is adjacent to, but separated by a non-conductive space from, an area of opposite potential, said grid structure being at least partially transparent to U.V. light and being located in front of said source of U.V. light in said recess, and
connected to said grid structure, means for converting electric current to a form effective to energize said grid with timed cycles of pulsed electric current at a controlled voltage and frequency.

* * * * *